United States Patent
Foti et al.

(10) Patent No.: US 9,094,790 B2
(45) Date of Patent: Jul. 28, 2015

(54) AUTOMATIC TRANSFER OF MACHINE-TO-MACHINE DEVICE IDENTIFIER TO NETWORK-EXTERNAL SERVICE PROVIDERS

(71) Applicant: Telefonaktiebolaget L M Ericsson (publ), Stockholm (SE)

(72) Inventors: George Foti, Dollard des Ormeaux (CA); Peter Hedman, Helsingborg (SE); Juan Antonio Sanchez Herrero, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 146 days.

(21) Appl. No.: 13/788,661

(22) Filed: Mar. 7, 2013

(65) Prior Publication Data

US 2014/0086144 A1    Mar. 27, 2014

Related U.S. Application Data

(60) Provisional application No. 61/648,891, filed on May 18, 2012.

(51) Int. Cl.
    *H04W 8/02*    (2009.01)
    *H04L 29/12*   (2006.01)
    (Continued)

(52) U.S. Cl.
    CPC .............. *H04W 8/02* (2013.01); *H04L 61/106* (2013.01); *H04W 4/005* (2013.01); *H04W 8/10* (2013.01); *H04W 8/26* (2013.01)

(58) Field of Classification Search
    None
    See application file for complete search history.

(56) References Cited

U.S. PATENT DOCUMENTS

| | | | |
|---|---|---|---|
| 5,678,179 A | 10/1997 | Turcotte et al. | |
| 8,854,960 B2 * | 10/2014 | Jain et al. | 370/230 |

(Continued)

FOREIGN PATENT DOCUMENTS

| | | |
|---|---|---|
| WO | 2009103623 A2 | 8/2009 |
| WO | 2011062841 A1 | 5/2011 |

(Continued)

OTHER PUBLICATIONS

Third Generation Partnership Project, "3GPP TS 23.682 V11.0.0 (Mar. 2012)", 3rd Generation Partnership Project; Technical Specification Group Services and System Aspects; Architecture enhancements to facilitate communications with packet data networks and applications (Release 11). Mar. 2012. pp. 1-24.

(Continued)

*Primary Examiner* — Anh-Vu Ly
(74) *Attorney, Agent, or Firm* — Murphy, Bilak & Homiller, PLLC

(57) ABSTRACT

Techniques for automatically transferring an external identifier for a wireless device from a wireless communication network serving the wireless device to a service provider external to the wireless communication network are disclosed. In an example method, carried out in one or more nodes of the wireless communication network, a binding between the external identifier and an internal identifier for the wireless device is maintained. A data session for the wireless device and corresponding to the service provider is established, wherein said establishing includes an assignment of an IP address to the wireless device. A request for the external identifier is received from the service provider, said request including the IP address for the wireless device. The external identifier is then sent to the service provider, in response to the request.

30 Claims, 11 Drawing Sheets

(51) Int. Cl.
*H04W 4/00* (2009.01)
*H04W 8/10* (2009.01)
*H04W 8/26* (2009.01)

(56) References Cited

U.S. PATENT DOCUMENTS

| | | | |
|---|---|---|---|
| 2011/0128911 A1 | 6/2011 | Shaheen | |
| 2013/0016657 A1* | 1/2013 | Muhanna et al. | 370/328 |
| 2013/0017827 A1* | 1/2013 | Muhanna et al. | 455/426.1 |
| 2013/0142118 A1* | 6/2013 | Cherian et al. | 370/328 |
| 2013/0196630 A1* | 8/2013 | Ungvari et al. | 455/411 |
| 2013/0203412 A1* | 8/2013 | Starsinic et al. | 455/435.1 |
| 2013/0212236 A1* | 8/2013 | Foti et al. | 709/221 |
| 2013/0273855 A1* | 10/2013 | Cherian et al. | 455/68 |
| 2013/0279373 A1* | 10/2013 | Ding et al. | 370/259 |
| 2013/0297744 A1* | 11/2013 | Foti | 709/219 |
| 2013/0310027 A1* | 11/2013 | Foti et al. | 455/432.1 |
| 2013/0315155 A1* | 11/2013 | Foti et al. | 370/329 |
| 2013/0318218 A1* | 11/2013 | Foti et al. | 709/222 |
| 2014/0086143 A1* | 3/2014 | Foti et al. | 370/328 |
| 2014/0219182 A1 | 8/2014 | Chandramouli et al. | |
| 2014/0286237 A1* | 9/2014 | Bhalla | 370/328 |
| 2015/0045074 A1* | 2/2015 | Wong et al. | 455/466 |

FOREIGN PATENT DOCUMENTS

| | | |
|---|---|---|
| WO | 2011098150 A1 | 8/2011 |
| WO | 2012142618 A2 | 10/2012 |
| WO | 2013115946 A1 | 8/2013 |

OTHER PUBLICATIONS

Third Generation Partnership Project, "3GPP TS 23.682 V11.3.0 (Dec. 2012)", 3rd Generation Partnership Project; Technical Specification Group Services and System Aspects; Architecture enhancements to facilitate communications with packet data networks and applications (Release 11). Dec. 2012. pp. 1-29.

Author Unknown, "ETSI TS 102 690 V2.0.1 (Dec. 2011)", ETSI. Technical Specification. Machine-to-Machine Communications (M2M); Functional Architecture. Dec. 2011. pp. 1-238.

Author Unknown, "Liaison Statement Answer to 3GPP SA2 on MTC Identification Aspects", ETSI TC M2M. 3GPP TSG-SA WG1 Meeting #55; S1-112213; M2M(11)0519r3. Aug. 8-12, 2011. pp. 1-2. Dublin, Ireland.

European Telecommunications Standards Institute. "Machine-to-Machine communications(M2M); Functional architecture." ETSI Technical Committee Machine-to Machine Communications (M2M),Technical Specification, ETSI TS 102 690 V1.1.9 (Sep. 2012), Sep. 2012, pp. 1-280.

3rd Generation Partnership Project, "3GPP TS 23.682 V11.1.0 (Jun. 2012)," 3rd Generation Partnership Project; Technical Specification Group Services and System Aspects; Architecture enhancements to facilitate communications with packet data networks and applications (Release 11). Jun. 2012. pp. 1-27.

3rd Generation Partnership Project, "3GPP TR 23.888 V1.6.1 (Feb. 2012)," 3rd Generation Partnership Project; Technical Specification Group Services and System Aspects; System Improvements for Machine-Type Communications (Release 11). Feb. 2012. pp. 1-165.

Author Unknown, "Mapping Aspects for ETSI M2M Architecture," 3GPP TSG SA WG2 Meeting #85; TD S2-112291; May 16-20, 2011. pp. 1-11. Xi'an, China.

Author Unknown, "M2M Service Enablement," Telefon AB LM Ericsson; M2M(12)19-076. Mar. 8, 2012. pp. 1-10.

Unknown, Author, "Machine-to-Machine communications (M2M); Functional architecture", ETSI TS 102 690 V1.1.1, Oct. 2011, 1-280.

* cited by examiner

AUTOMATIC TRANSFER OF MACHINE-TO-MACHINE DEVICE IDENTIFIER TO NETWORK-EXTERNAL SERVICE PROVIDERS

RELATED APPLICATIONS

This application claims the benefit of and priority to U.S. Provisional Patent Application Ser. No. 61/648,891, filed 18 May 2012. The entire contents of said U.S. Provisional patent application are incorporated herein by reference.

This application is related to a co-pending application filed by the present applicants on the same day as the present application, and titled "Selection of M2M Devices by External Triggering," the entire contents of which are incorporated herein by reference. This application is further related to another co-pending application filed by the present applicants on the same day as the present application and titled "Method and Apparatus for Associating Service Network Identifiers with Access Network Identifiers," the entire contents of which are incorporated herein by reference.

TECHNICAL FIELD

The present disclosure generally relates to wireless communication networks and service provider networks external to such wireless communication networks, and particularly relates to techniques in a wireless communication network for providing external identifiers for devices to a service provider network external to the wireless communication network.

BACKGROUND

In an environment in which Machine-to-Machine (M2M) devices are connected to an M2M service provider (SP) through an access network provided by another entity, the M2M service provider effectively creates a service layer on top of the access layer provided by the access network and uses this service layer to deliver services to the M2M devices. However, for the service provider to identify devices on the network, there is a requirement that the service provider network and the access network agree on at least one identifier to be used to reach the M2M device. In the M2M framework developed by the European Telecommunications Standards Institute (ETSI), the M2M Service Provider (SP) interworks with the access network with respect to an M2M device that is subscribed with the M2M SP. This interworking is typically performed using an external identifier specifically selected for that purpose, although other available identifiers that might be used to identify the M2M device include the device's Mobile Station Integrated Services Digital Network-Number (MSISDN) or IP Multimedia Public Identity (IMPU). The external identifier is typically allocated to an M2M service provider by the access network for the M2M device. The external identifier is used for interworking purposes instead of the IMSI, which is typically reserved for use as a private identity by the access network and not used on external (public) interfaces.

Large-scale deployments of M2M devices are anticipated, some of which may require implementation of multiple applications in each of many M2M devices. In some cases, different applications on an M2M device will correspond to different M2M SPs. While in many cases the M2M device will initiate communications through the access network to the external M2M SP(s), in some cases the connectivity provided to the device by the access network should be triggered by the M2M SP. This is the rationale behind a device triggering procedure specified by the $3^{rd}$-Generation Partnership Project (3GPP), for use by M2M SPs seeking to initiate a connection with a M2M device from outside a 3GPP access network serving the M2M Device. This device triggering procedure is referred to as MTC Device Triggering by 3GPP, where "MTC" refers to "Machine-Type Communications" and may be regarded as a synonym for "Machine-to-Machine Communications."

Accordingly, an external identifier is defined in Release 11 of the 3GPP standards, for use by M2M SPs in association with MTC Device Triggering procedures. However, the 3GPP specifications do not describe how external networks can acquire the external identifier for a particular M2M device, for interworking purposes. Furthermore, ETSI M2M standards do not yet consider the use of the MTC Device Triggering procedure, and do not specify a mechanism for acquiring external identifiers for M2M devices from cellular networks or other access networks.

SUMMARY

Several embodiments of the systems, apparatus, and methods detailed below provide for the transferring of an external identifier for a wireless device from a wireless communication network serving the wireless device to a service provider external to the wireless communication network. The exemplary embodiments described below allow a Machine-to-Machine (M2M) service provider to retrieve the external identifier for interworking purposes in scenarios where the access network provider has not previously provisioned the M2M service provider with the external identifiers allocated to M2M devices. The described techniques thus allow for an architecture that relies upon the M2M service provider to retrieve the external identifier when it needs it for interworking purposes, such as for waking up an M2M device using device triggering procedures. As a result, the M2M service provider can avoid obtaining the external identifiers unless and until they are required, which has several advantages.

An example method, carried out in one or more nodes of a wireless communication network serving a wireless device, provides an external identifier for a wireless device to a service provider external to the wireless communication network. The example method comprises maintaining a binding between the external identifier and an internal identifier for the wireless device, establishing a data session for the wireless device and corresponding to the service provider, wherein said establishing is initiated by the wireless device, and receiving, from the service provider, a request for the external identifier, said request including an IP address for the wireless device. The external identifier is then sent to the service provider, in response to the request. In some embodiments, establishing a data session for the wireless device comprises activating a Packet Data Protocol (PDP) context, for example, or establishing an Evolved Packet Subsystem (EPS) bearer.

In some embodiments, the request for the external identifier is received at an InterWorking Function (IWF) node in the wireless communication network. In some of these embodiments, the method further comprises sending a query from the IWF node to another node in the wireless communication network, such as a Home Subscriber Server (HSS) node, in response to the request. The query comprises the IP address for the wireless device. The external identifier for the wireless device is received in response to the query, and can then be forwarded on to the service provider. In others of these embodiments, the method again comprises sending a query from the IWF node to another node in the wireless communication network, in response to the request, the query comprising the IP address for the wireless device. In these embodiments, however, a device identifier for the wireless device is received in response to the first query. A second query is then sent from the IWF node to a third node in the wireless communication network, the second query comprising the device identifier, and the external identifier for the wireless device is received in response to the second query, for forwarding to the service provider.

Another example method according to the various techniques detailed herein is suitable for implementation in a network node that is associated with a service provider network. This example method comprises establishing a data session with a wireless device having a service capability layer (SCL) associated with the service provider network, wherein said data session is carried over a wireless communication network, and receiving, from the wireless device, a service provider network identifier for the wireless device. A request for an external identifier associated with the wireless device is then sent to the wireless communication network, the request including an IP address used to address the wireless device through the wireless communication network, and the external identifier is received from the wireless communication network, in response to the request. The external identifier received from the wireless communication network is then bound to the service provider network identifier, to thereby establish a mapping between the external identifier and the service provider network identifier for subsequent use by the service provider network in triggering communications with the wireless device through the wireless communication network. In some embodiments, the IP address is received from the wireless device, e.g., along with the service provider network identifier for the wireless device. In other embodiments, a Fully Qualified Domain Name is received from the wireless device instead of an IP address, in which case the Fully Qualified Domain Name can be used to obtain the IP address.

Another example method begins with the maintaining of a binding between service provider subscription information for the wireless device and an internal identifier for the wireless device. This might be carried out by an HSS node, for example. An accounting start notification is then sent to an authentication server, in response to establishment of a bearer by the wireless device. This accounting start notification includes an IP address allocated to the wireless device and corresponding to the bearer set up by the wireless device, as well as a device identifier for the wireless device and a data network identifier (such as an Access Point Name) corresponding to the data session established by the wireless device. A query for an external identifier for the wireless device is subsequently received, e.g., at a HSS node. This query, which may be received from an IWF, in some embodiments, includes a device identifier for the wireless device that has been obtained from the authentication server. In response to the query, the external identifier for the wireless device is then sent to an IWF node, for forwarding to the service provider in conjunction with the IP address for the wireless device. In some embodiments, the query is received at the HSS node from the IWF node. In some of these embodiments, the method further includes notifying the IWF of an activation, prior to receiving said query. This notification includes the IP address for the wireless device and a device identifier for the wireless device.

A related method is carried out in a node that provides an Inter-Working Function (IWF) between the wireless communication network and a service provider network that is external to the wireless communication network. This example method begins with the receiving of an activation notification from an authentication server, the activation notification indicating that a wireless device has attached to the network. The activation notification includes a device identifier for the wireless device (e.g., an MSISDN), the Access Point Name (APN) or other data network identifier for the M2M service provider that corresponds to the data session established by the wireless device, and an IP address for the wireless device. The method continues with sending a query for an external identifier for the wireless device, to a second node in the wireless communication network, e.g., an HSS. This query includes the device identifier for the wireless device. The IWF then receives the external identifier for the wireless device, in response to the query. The external identifier is forwarded to the service provider, in conjunction with the IP address for the wireless device.

Other embodiments of the techniques detailed herein include apparatus configured to carry out all or parts of the processes detailed below and summarized above. For instance, one such embodiment is a home subscriber server node for use in a wireless communications network serving a wireless device, the home subscriber server node comprising one or more interfaces adapted for communication with at least a radio access network serving the wireless device and one or more other nodes in the wireless communication network, and one or more processing circuits. The one or more processing circuits are adapted to maintain a binding between an external identifier for the wireless device, an internal identifier for the wireless device, and a data session identifier corresponding to the external identifier. The processing circuits are further adapted to receive a query from a second node in the radio access network, the query comprising the internal identifier for the wireless device, and to send the external identifier to the second node. The second node may be an IWF node, in some embodiments. In some embodiments, the internal identifier is an MSISDN for the wireless device. Likewise, the associated data network identifier may be an Access Point Name (APN) or a Network Service Access Point Identifier (NSAPI), or both, in some embodiments.

Another example embodiment is an interworking function (IWF) node for use in a wireless communications network serving a wireless device, the IWF node comprising one or more interfaces adapted for communication with at least a home subscriber server (HSS) node in the wireless communications network and an external service provider, and one or more processing circuits. The one or more processing circuits are adapted to receive, from the service provider, a request for the external identifier, said request including an IP address for the wireless device. The one or more processing circuits are further adapted to retrieve the external identifier from another node in the wireless communication network, using the IP address, and to send the external identifier to the service provider, in response to the request. In some embodiments, the one or more processing circuits are adapted to retrieve the external identifier by sending a query to a second node in the wireless communication network, in response to the request from the service provider, the query comprising the IP address for the wireless device. The processing circuits are further adapted to receive the external identifier for the wireless device in response to the query. The second node may be a Home Subscriber Server node, for example. In other embodiments, the one or more processing circuits are adapted to retrieve the external identifier by: sending a first query from the IWF node to a second node in the wireless communication network, in response to the request, the first query comprising the IP address for the wireless device; receiving a device identifier for the wireless device in response to the first query; sending a second query from the IWF node to a third node in the wireless communication network, the second query comprising the device identifier; and receiving the external identifier for the wireless device in response to the second query. In some of these embodiments, the second node is an authentication server node and the third node is a Home Subscriber Server (HSS) node in the wireless communication network. The device identifier in these embodiments may be an MSISDN for the wireless device, for example.

Still another example embodiment is a server provider node that includes a communication interface for communicating with a wireless communication network and for communicating with the wireless device via signaling conveyed through the wireless communication network. The node further includes a processing circuit that is configured to: establish a data session with a wireless device having a service capability layer (SCL) associated with the service provider network, wherein said data session is carried over a radio access network; receive, from the wireless device, a service provider network identifier for the wireless device; send, to the radio access network, a request for an external identifier associated with the wireless device, the request including an IP address used to address the wireless device through the radio access network; receive the external identifier from the radio access network, in response to the request; and bind the external identifier received from the radio access network to the service provider network identifier, to thereby establish a mapping between the external identifier and the service provider network identifier for subsequent use by the service provider network in triggering communications with the wireless device through the access network. In some embodiments, the IP address is received from the wireless device prior to the sending operation. In others, a Fully Qualified Domain Name is received instead, in which case the IP address for the wireless device can be derived from the Fully Qualified Domain Name. In some embodiments, the processing circuit is configured to send the request for the external identifier to an interworking function (IWF) in the radio access network and to subsequently receive the external identifier from the IWF in the radio access network Of course, the techniques, systems, and apparatus described herein are not limited to the above features and advantages. Indeed, those skilled in the art will recognize additional features and advantages upon reading the following detailed description, and upon viewing the accompanying drawings.

BRIEF DESCRIPTION OF THE DRAWINGS

Embodiments of the present techniques will now be described, by way of example only, with reference to the attached Figures, wherein.

DETAILED DESCRIPTION

In the discussion that follows, reference may be made below to specific elements, numbered in accordance with the attached figures. The discussion below should be taken to be exemplary in nature, and not as limiting the scope of the techniques detailed. The scope of these techniques is defined in the claims, and should not be considered as limited by the implementation details described below, which, as one skilled in the art will appreciate, can be modified by replacing elements with equivalent functional elements.

The present disclosure uses both the term "M2M device" and the term "wireless device." The term "M2M device" is sometimes used by those skilled in the art to refer to a logical entity, as opposed to a physical entity. Of course, in practice this logical entity is embodied in a physical device. Accordingly, as used herein, the term "M2M device" should be understood to refer to the logical entity as embodied in a physical device, such as a 3GPP-compliant wireless device (referred to in 3GPP documentation as "user equipment, or "UE") or another wireless device. As a result, the terms "M2M device" and "wireless device" as used herein may generally be regarded as interchangeable, unless the context indicates otherwise.

Figure 1:
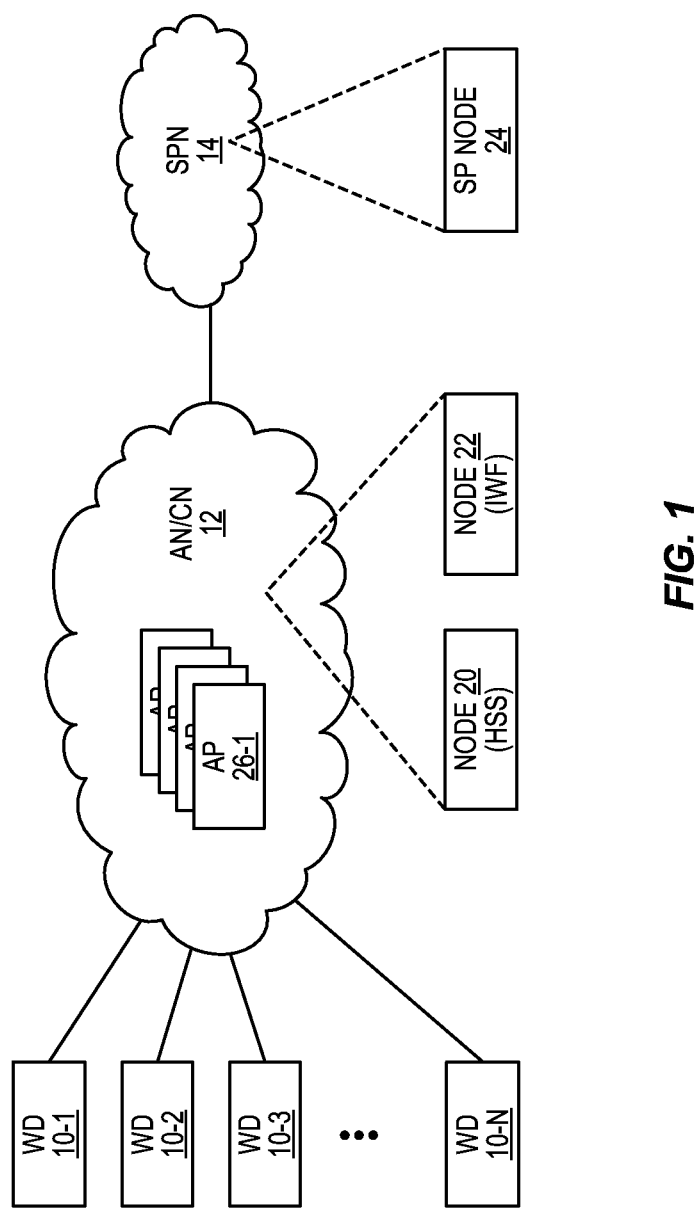
FIG. 1 is a block diagram of example access and service provider networks and associated wireless devices, according to one or more embodiments taught herein.

FIG. 1 illustrates a plurality of wireless devices 10, which are individually referenced as device 10-1, 10-2, and so on, when needed for clarity, and are otherwise referred to generically as "wireless devices 10" in the plural sense and as "wireless device 10" in the singular sense. While connectivity between the wireless devices 10 and an access network 12 is suggested in the diagram, it will be appreciated that not all of the wireless devices 10 are necessarily in operation or connected to the access network 12 at any given instant in time. Note that in the diagram, the access network 12 is abbreviated as "AN/CN 12" merely to connote that there generally are Core Network (CN) entities of interest therein. Some of these entities are discussed later herein. The access network/core network combination is referred to as a "wireless communication network" herein.

For now, it should be understood that each wireless device 10 is configured for communication with the access network 12, and for communication with a service provider network 14, which is accessible to the wireless device 10 via the access network 12. In an example case, the access network 12 comprises a Third Generation Partnership Project (3GPP) access network, such as a WCDMA- or LTE-based cellular data network, and each wireless device 10 comprises a User Equipment or UE, which includes a 3GPP-based radio modem or other such transceiver circuitry for communicating with the 3GPP network. In another example, the access network 12 comprises a network specified by the $3^{rd}$-Generation Partnership Project 2 (3GPP2) and supporting radio access based on Code-Division Multiple Access (CDMA) and/or High-Rate Packet Data (HRPD) technologies. More broadly, the wireless device 10 includes a communication transceiver for communicating with the access network, which may be essentially any type of network usable for connecting to the service provider network 14, and includes processing circuitry configured for the appropriate protocols and signaling with respect to both such networks.

In more detail, the wireless device 10 is configured or otherwise provisioned with subscription credentials or other such authentication information as needed to attach to and establish a data session with the access network 12, and as needed for registering for a service provided by the service provider network 14, and communicating with the service provider network 14 in the context of that service. In a non-limiting example, the wireless device 10 hosts a Machine-Type-Communication (MTC) application that is subscribed to a Machine-to-Machine (M2M) service provided in the service provider network 14 operating as an M2M network.

Thus, in initializing or otherwise initially registering the MTC application, the wireless device 10 attaches to the access network 12, establishes a data session with the access network 12 for communicating with the service provider network 14, and then uses that data session to register the MTC application in the M2M network. According to the advantageous teachings herein, various nodes in the access network 12 and in the service provider network 14 are configured to facilitate a connection between the wireless device 10 and the service provider network 14 in a manner that allows the service provider network 14 to bind a service provider network identifier used by the service provider network 14 to identify the wireless device 10 with respect to a service provided by the service provider network 14, and an external identifier that is assigned by the access network 12 to the wireless device 10, for use by the service provider network 14 in identifying the wireless device 10 to the access network 12.

As those of ordinary skill in the art will appreciate, use of the external identifier allows the access network 12 to keep private the International Mobile Subscriber Identity (IMSI) or other such access network identifier of the wireless device 10. That is, the access network 12 does not provide the access network identifier of the wireless device 10 to the service provider network 14 and instead provides an external identifier that has been logically bound to the access network identifier within the access network 12.

In this manner, the IMSI or other sensitive access network identifier of the wireless device 10 is not compromised by releasing it to the external service provider network 14. However, the external identifier itself has no predefined meaning within the service provider network 14, because the service provider network 14 uses a service provider network identifier—e.g., an identifier embedded in service credentials provisioned within the wireless device 10—to identify the wireless device 10. Consequently, without more, simply receiving an external identifier from the access network 12 is of little value to the service provider network 14 because it does not know in advance which one of the plurality of wireless devices 10 has been assigned to the external identifier by the access network 12.

Currently there is no defined procedure to allow an M2M service provider to automatically retrieve the external identifier that has been allocated to an M2M device by the wireless communication network, e.g., by a Home Subscriber Server (HSS). One possible mechanism currently available is through manual management procedures, which may limit potential flexibility in deploying M2M devices in the field and/or which may impose major service-provider server provisioning efforts. If the M2M service provider cannot access the external identifier associated with its M2M entities (e.g., M2M Nodes or Service Capability Layer—SCL instances), it cannot use the services that may be implemented by the access network in association with the external identifier, such as the Device Triggering procedure being specified in Release 11 of the 3GPP standards. To date, the use of the MTC Device Triggering procedure and the mechanism to retrieve identifiers from cellular networks are not considered by M2M ETSI standards or by the standards of any similar standard bodies like one M2M.

Several embodiments of the techniques, apparatus, and systems disclosed herein may obviate or mitigate these problems. Accordingly, the systems, apparatus, and methods described provide for the transferring of an external identifier for a wireless device from a wireless communication network serving the wireless device to a service provider external to the wireless communication network. The exemplary embodiments described below allow an M2M service provider to retrieve the external identifier for interworking purposes in scenarios where the access network provider has not previously provisioned the M2M service provider with the external identifiers allocated to M2M devices. The described techniques thus allow for an architecture that relies upon the M2M service provider to retrieve the external identifier when it needs it for interworking purposes, such as for waking up an M2M device using device triggering procedures. As a result, the M2M service provider can avoid obtaining the external identifiers unless and until they are required, which has a plurality of beneficial advantages.

The techniques described below support automatic transmission of the external identifier for a wireless device to the M2M service provider in such way that the M2M service provider can associate it with one or more specific M2M entities, such as an M2M Node, Service Capability Layer (SCL) instance, or M2M connection. The ETSI standards for M2M define a generic mechanism, namely SCL registration, to associate the IP address assigned to the M2M device, by the access network, with identifiers for these M2M entities, assigned by the service provider, whereby the IP address is included in a data structure called an M2M Communication Point of Contact, or PoC (sometimes abbreviated M2M PoC or m2mPoC) resource, which is maintained by the service provider. The inclusion of the external identifier in the m2mPoc resource, as another communications address, allows the external identifier to be easily retrieved by the service provider for specific procedures, such as Device Triggering procedures supported by the access network serving the M2M device.

Several related mechanisms for automatically transmitting the external identifier for a wireless device to the M2M service provider are detailed below. At least one of these mechanisms is based on a technique that "pulls" information from the 3GPP system, when needed, through querying a Machine-Type Communications InterWorking Function (MTC-IWF) to obtain the external identifier associated with a specific IP address. Another mechanism is based on a "pushing" of the external identifier by the 3GPP system, again via the MTC-IWF.

To facilitate interworking in scenarios where multiple SCL instances associated with different M2M SPs exist for the same device, distinct external identifiers are allocated to each M2P SP and the 3GPP system allows for the association of each external identifier with a specific M2M service provider. The M2M provider can be defined explicitly, e.g., via a domain part of the external identifier, or implicitly, e.g., via an Access Point Name (APN) associated with this specific external identifier. For simplicity in presentation, the call flows discussed below are based on the implicit association of specific APNs to specific M2M service providers, but it should be appreciated that the techniques illustrated by these call flows are not restricted to this approach.

Figure 2:
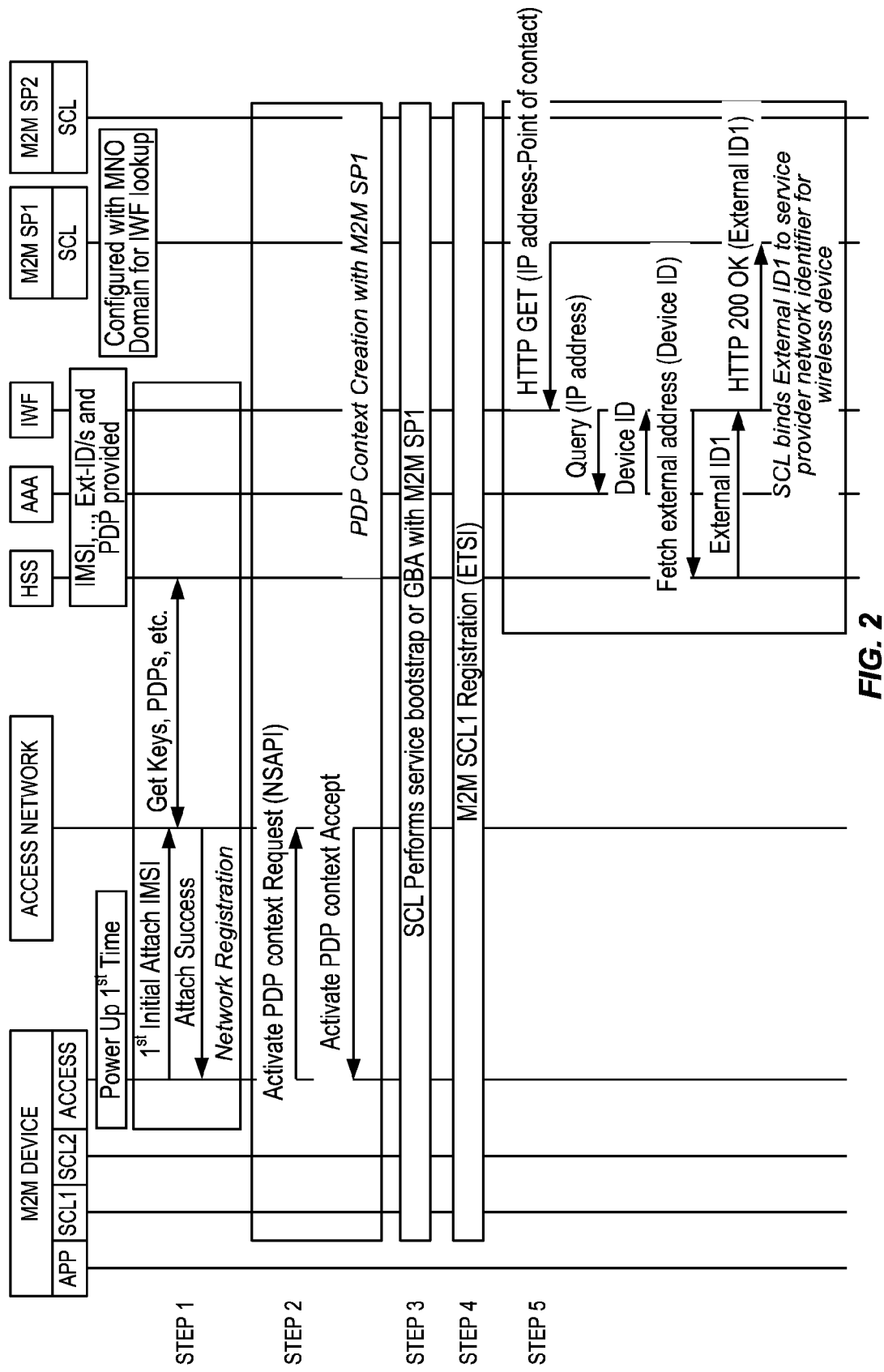
FIG. 2 is a signal flow diagram according to one or more embodiments taught herein.

FIG. 2 illustrates a call flow corresponding to a process for retrieving an external identifier for an M2M device, for transfer to an M2M service provider external to the access network serving the M2M device. The call flow depicts a wireless device having a single IMSI, but having two distinct SCL capabilities (SCL1 and SCL2), implying two independent subscriptions with two different M2M service providers. For the purposes of understanding the call flow, it should be understood that each SCL has previously been provided with the proper Access Point Name (APN) corresponding to its M2M service provider.

Note that there can be more than two distinct SCLs in the wireless device. The illustrated use of two is exemplary, and is done for the purposes of a simplified explanation and compactness. The access network holds, in an access profile for the wireless device, information pertaining to each SCL in the M2M device. This access profile may be maintained in a Home Subscriber Server (HSS), for example. To that effect, HSS maintains a binding between the M2M device/subscription and each SCL resident on that device (or for that subscription). Furthermore, for each SCL, the HSS maintains a binding between the SCL, the external identifier allocated to the SCL, and the APN used to access the M2M service provider associated with the SCL. Other information may also be stored within the binding.

As seen in FIG. 2, the process starts with "Step 1," where the access part of the M2M device is authenticated for network access. This is carried out by conventional procedures specified for the access network, e.g., by 3GPP access network specifications. Thus, as shown in FIG. 2, the wireless devices performs an initial attach to the access network, providing its IMSI. Standard procedures are followed for exchanging keys, setting up allowed data connections (e.g., PDP contexts, etc.), and so on. Once the wireless device is successfully authenticated, as indicated by the "Attach Success" message in FIG. 2, the M2M device access profile can be downloaded in the access network for enforcement purposes.

As shown at "Step 2" in FIG. 2, the SCL1 of the M2M device then establishes a data connection, using the APN that corresponds to the M2M server for SCL1, in this case M2M SP1. In the illustrated scenario, the wireless device established a PDP context by sending an "Activate PDP Context Request" that includes the APN, NSAPI, or other data connection identifier; the access network responds by activating the data connection and providing an appropriate response. The details of setting up a PDP context or other data connection (such as an Evolved Packet Subsystem bearer) are well known, and thus are not shown in FIG. 2. As noted above, it should be understood that each SCL within the M2M device knows the APN associated with it and which it has to use for bearer establishment. If only one SCL is possible for the subscription/device or if the same APN can be used for all SCLs, then a default APN in HSS can be used, i.e., there is no need to provision APN into the device.

As seen at "Step 3" of FIG. 2, the SCL1 then performs a service bootstrap with the M2M service provider, using procedures corresponding to the M2M service, such as M2M procedures standardized by ETSI, or using procedures based on the Generic Bootstrap Architecture (GBA) specified by 3GPP. As shown at "Step 4," the SCL1 registers with its M2M service provider, again using procedures required by the M2M service provider, which may be based on ETSI procedures. In this step, the M2M device provides the service provider device identifier allocated to it by the service provider as well as its IP address (which has been previously allocated to the M2M device by the access network) to the M2M service provider network, through a parameter defined in ETSI specifications as M2M point of contact (m2mpoc). This is stored in the service provider network and can be used later as will be described to retrieve the external identifier associated with the IP address and the specific SCL instance in question. Note that in some cases or in some embodiments the M2M device may send a Fully Qualified Domain Name to the M2M service provider network, instead of an IP address. It will be appreciated that the service provider network node can derive the IP address from the Fully Qualified Domain Name using conventional domain name resolution procedures.

As shown at "Step 5," which can occur at any time following an SCL registration, the M2M service provider retrieves the external identifier corresponding to an SCL for an M2M device. In this example, the M2M Network SCL (M2M NSCL) sends an HTTP GET request to the IWF, requesting the external identifier allocated to the SCL whose IP contact point/address (received in step 4) is included in the HTTP request. Note that protocols other than HTTP may be used, such as the Diameter protocol for authentication, authorization and accounting specified by the Internet Engineering Task Force (IETF).

In the embodiment illustrated in FIG. 2, the IWF forwards the request to the AAA server, which may belong to the access network or to the M2M server provider itself. The AAA server stores the IP address and an internal identifier associated with the wireless device (in this case the wireless device may be identified with MSISDN, for example), among other information. The AAA server returns this internal identifier (e.g., the MSISDN) to the IWF. The IWF, in turn, sends this information to the HSS, to locate the external identifier that is bound to the internal identifier. In this example, the external identifier is "External ID1." The HSS then returns the located external identifier to the IWF, which in turn returns it to the M2M service provider, i.e., to the M2M NSCL at the M2M SP1 node. The M2M service provider can then use the external identifier any time that it desires a service from the access network, such as waking up the device. Note that the M2M NSCL must bind the external identifier to the service provider network identifier allocated to the M2M device by the service provider and received during the registration process in step 4. This binding can be stored within the m2mPoc resource for the SCL in question.

It should be appreciated that variations of the specific technique illustrated in FIG. 2 are possible. For example, in one such variation the AAA server queries the HSS for the external ID associated with an internal identifier (e.g., an MSIDSN), instead of the IWF. In this case, the AAA server returns the external identifier directly to the IWF. In other embodiments, the AAA server or even the HSS may be queried directly from the M2M server provider node, without IWF intervention. The AAA may also hold the external identifier (e.g., in a data record synchronized with the HSS) and directly reply with the external identifier to the requesting party, e.g., the IWF or M2M NSCL. In still other embodiments, the AAA and HSS functionality may be provided by a single node, in which case the transactions between the AAA and HSS described above are unnecessary or may be internalized in the combined AAA/HSS node.

Note that FIG. 2 does not illustrate any interaction between SCL2 on the M2M device and the service provider node M2M SP2. It should be appreciated, however, that operations like those shown at steps 2, 3, 4, and 5 may be carried out with respect to SCL2 and M2M SP2, independently of the operations shown in FIG. 2, using a different external identifier for the M2M device and an APN and/or NSAPI corresponding to M2M SP2.

Figure 3:
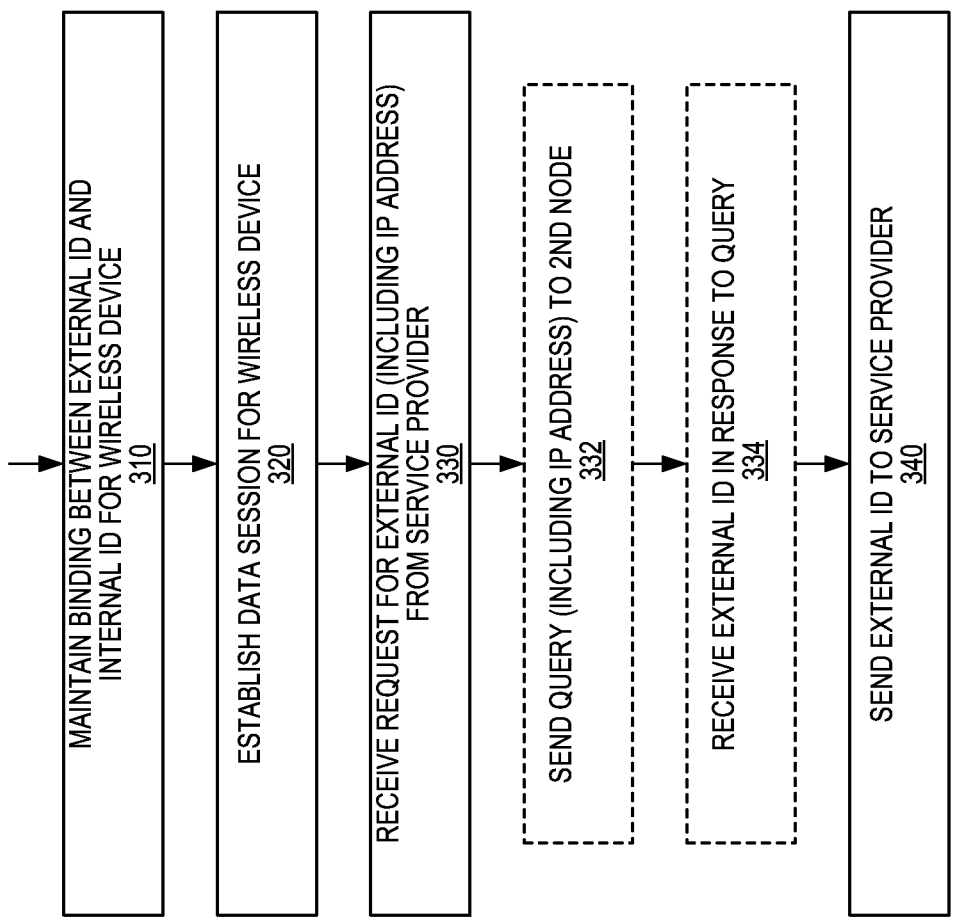
FIG. 3 is a process flow diagram of one embodiment of a method of providing an external identifier for a wireless device to a service provider external to the wireless communication network serving the wireless device.

With the example call flow shown in FIG. 2 in mind, it will be appreciated that FIG. 3 illustrates a generalized process flow for providing an external identifier for a wireless device to a service provider external to the wireless communication network serving the wireless device. The operations shown in FIG. 3 may be carried out in one or several nodes of the wireless communication network serving the wireless device, as detailed below.

As shown at block 310, the illustrated process begins with the maintaining of a binding between the external identifier and an internal identifier for the wireless device. This binding may be maintained in an HSS, for example, or in an AAA server. In some embodiments, the data records tracking the binding may be synchronized between two or more nodes, or may be maintained in a network node that serves a combination of roles, such as any of the HSS, AAA server, and/or IWF roles discussed above.

As seen at block 320, a data session for the wireless device is established. This data session corresponds to the service provider, e.g., according to an APN and/or NSAPI, or other data network identifier that indicates an access point name or gateway for connection to the service provider node. The establishing of the data session generally involves conventional procedures that are specific to the access network serving the wireless device. In some embodiments or instances, for example, establishing a data session for the wireless device comprises activating a PDP context. In other embodiments or instances, establishing a data session for the wireless device may instead comprise establishing an EPS bearer. Note that in some contexts, an IP address is assigned to the wireless device at the time the data session is established. In others, an IP address is instead assigned to the wireless device upon successful attachment to the network.

As shown at block 330, a request for the external identifier is received from the service provider, the request including the IP address for the wireless device. In response, as shown at block 340, the external identifier is then sent to the service provider. As discussed above, the service provider can then bind the external identifier to the service provider device identifier or any other communication addresses that it is maintaining for the wireless device.

In some of the embodiments described above, the request for the external identifier from the service provider is received at an InterWorking Function (IWF) node in the wireless communication network. In some of these embodiments, the IWF then sends a query to another node in the wireless communication network, e.g., an authentication server node or HSS node, in response to the request, the query comprising the IP address for the wireless device. The IWF then receives the external identifier for the wireless device in response to the query. This is shown at blocks 332 and 334 of FIG. 3, which are shown with dashed outlines to indicate that these transactions need not occur in every implementation of the general technique shown in FIG. 3.

Figure 4:
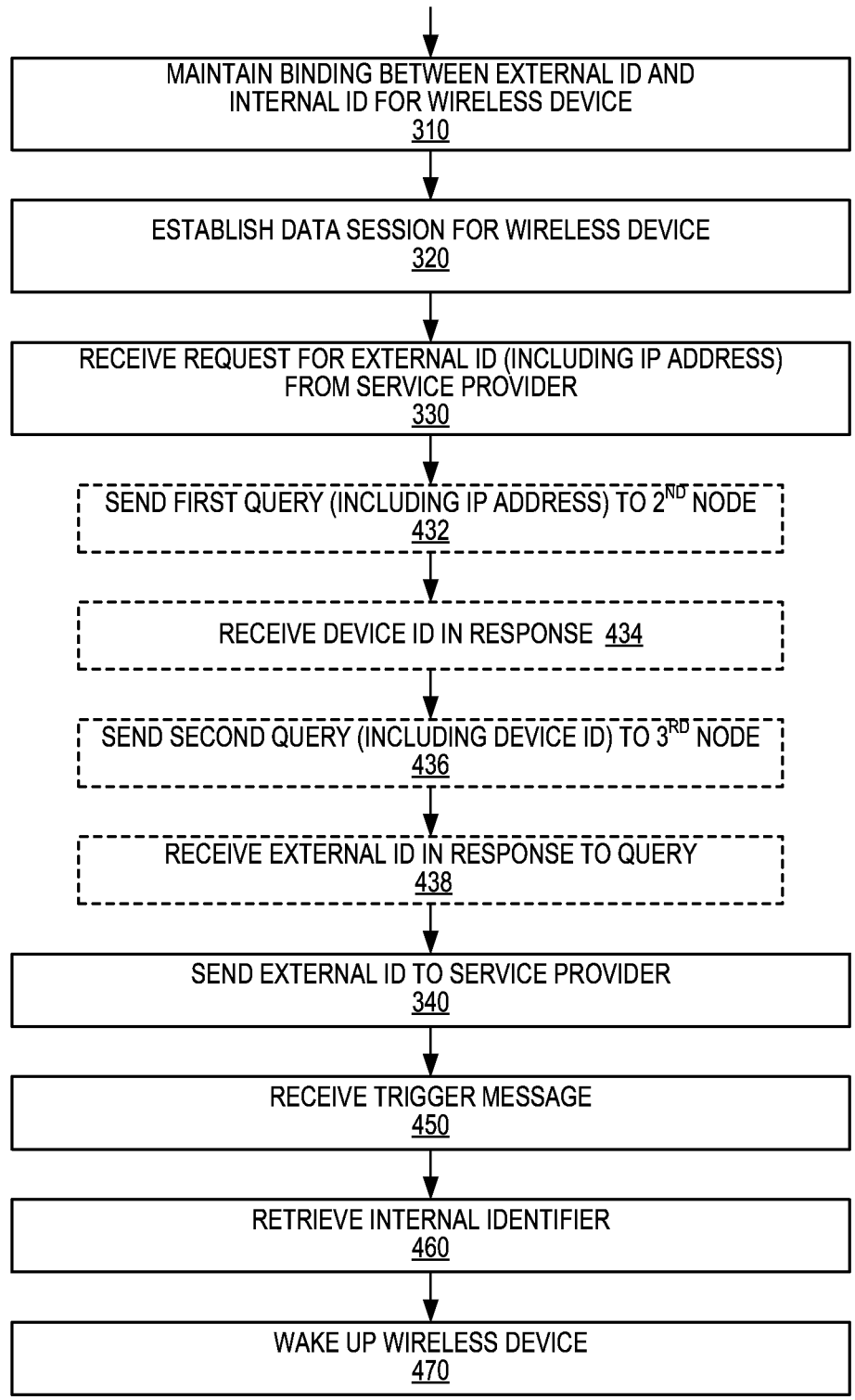
FIG. 4 is a process flow diagram illustrating a variant of the method shown in FIG. 3.

FIG. 4 illustrates a slight variation from the above. The process flow shown in FIG. 4 begins in the same manner as the process flow of FIG. 3, as shown at blocks 310, 320, and 330, and also includes a step in which the external identifier for the wireless device is sent to the service provider, as shown at block 340 in both figures. In embodiments represented by the process flow of FIG. 4, the request for the external identifier is received at an IWF node (as shown at block 330), which again sends a query from the IWF node to a second node in the wireless communication network, in response to the request, the query comprising the IP address for the wireless device. This is shown at block 432. In this variant, however, the IWF receives a device identifier other than the external identifier in response to the first query, as shown at block 434. This device identifier is an MSIDSN in some embodiments, for example. The IWF then sends a second query to a third node in the wireless communication network, the second query comprising the device identifier, as shown at block 436. The IWF then receives the external identifier for the wireless device in response to the second query, as shown at block 438, and sends the external identifier to the service provider, as shown at block 340. In some of these embodiments, the second node is an authentication server node, while the third node is a Home Subscriber Server (HSS) node in the wireless communication network.

FIG. 4 also shows several additional operations, at blocks 450, 460, and 470. These operations may occur (if at all) any time after the operations shown at block 310-340, i.e., at any time after the service provider has received the external identifier for the wireless device from the wireless communication network. It should be appreciated that these same operations may take place in conjunction with the process flow of FIG. 3, as well.

As shown at block 450, the wireless communication network receives a trigger message from the service provider. This may be received at the IWF, for example, and includes the external identifier for the wireless device. As shown at block 460, the internal identifier for the wireless device is then retrieved, using the external identifier. The internal identifier is then used to wake the wireless device, as shown at block 470.

Figure 5:
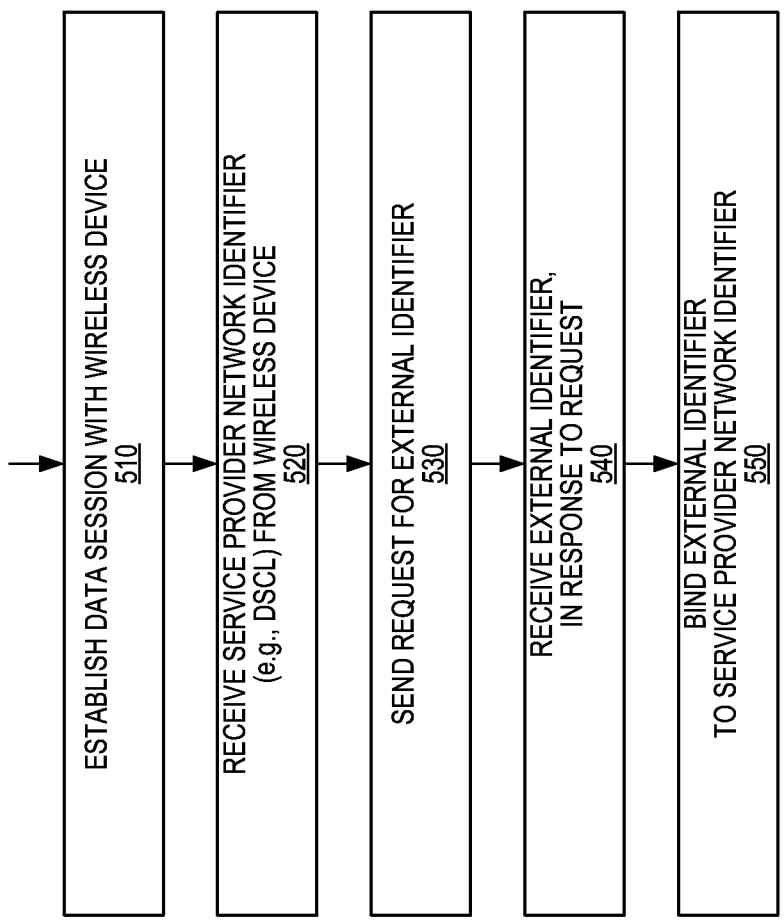
FIG. 5 is a process flow diagram illustrating an example method carried out by a service provider node.

FIG. 5 is a process flow diagram illustrating an example method carried out by a network node that is associated with a service provider network, e.g., a server apparatus running an M2M service. As shown at block 510, the illustrated method begins with the establishing of a data session with a wireless device having a service capability layer (SCL) associated with the service provider network. The data session is established with and is carried over a wireless communication network, including a radio access network, and may be initiated by the wireless device, for example. As shown at block 520, a service provider network identifier for the wireless device is received, via the data session. This service provider network identifier may be a DSCL or GSCL identifier, for example.

Because the service provider network identifier is received over the data session, the service provider node now has a link between the service provider network identifier and the IP address used to address the wireless device through the data session. This link can be used to "pull" an external identifier from the wireless communication network, since this is the IP address allocated by the wireless communication network to the wireless device. Thus, as shown at block 530, a request for an external identifier associated with the wireless device is sent to the wireless communication network, the request including the IP address used to address the wireless device through the wireless communication network. As shown at block 540, the external identifier is then received, in response to the request. The request for the external identifier is sent to an interworking function (IWF) in the wireless communication network, in some embodiments, and the external identifier subsequently received from the IWF as well. As shown at block 550, the external identifier received from the wireless communication network is bound to the service provider network identifier, to thereby establish a mapping between the external identifier and the service provider network identifier for subsequent use by the service provider network in triggering communications with the wireless device through the wireless communication network.

As discussed above, the service provider network in some embodiments comprises a Machine Type Communication (MTC) network. In these embodiments, the service provider network identifier may be a Services Capability Layer ID (SCL-ID) associated with an MTC application implemented in the wireless device. Thus, binding the external identifier to the service provider network identifier in these embodiments comprises binding the external identifier to the SCL-ID, for subsequent use by the service provider network in triggering communications with the wireless device through the wireless communication network. In some of these embodiments, an M2M service bootstrapping and a corresponding M2M service registration of the MTC application implemented in the wireless device is carried out between the wireless device and the service provider, via communication through the wireless communication network. The binding in these embodiments may be performed as part of the M2M service registration.

Figure 9:
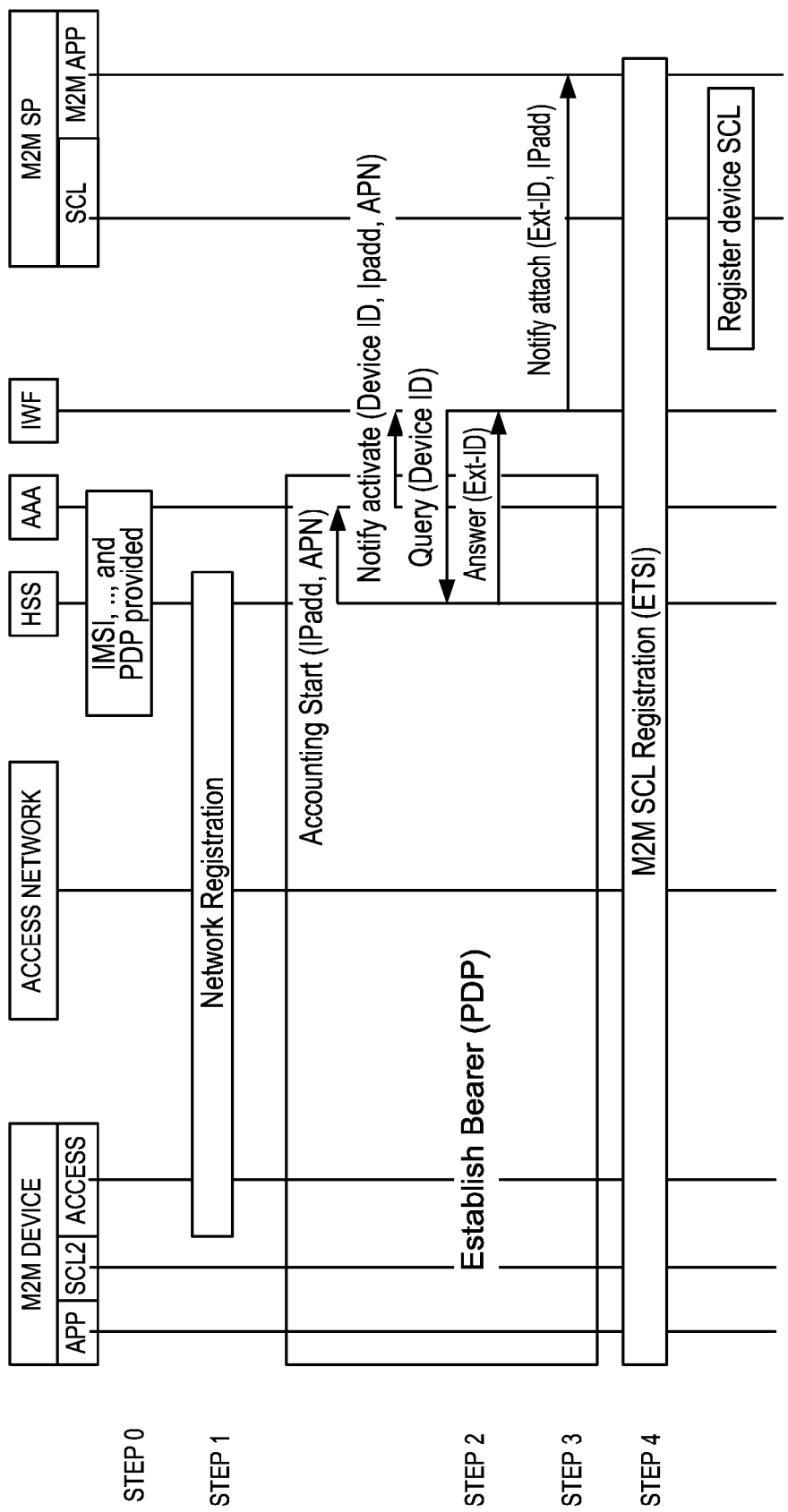
FIG. 9 is a signal flow diagram according to one or more additional embodiments described herein.
Figure 10:
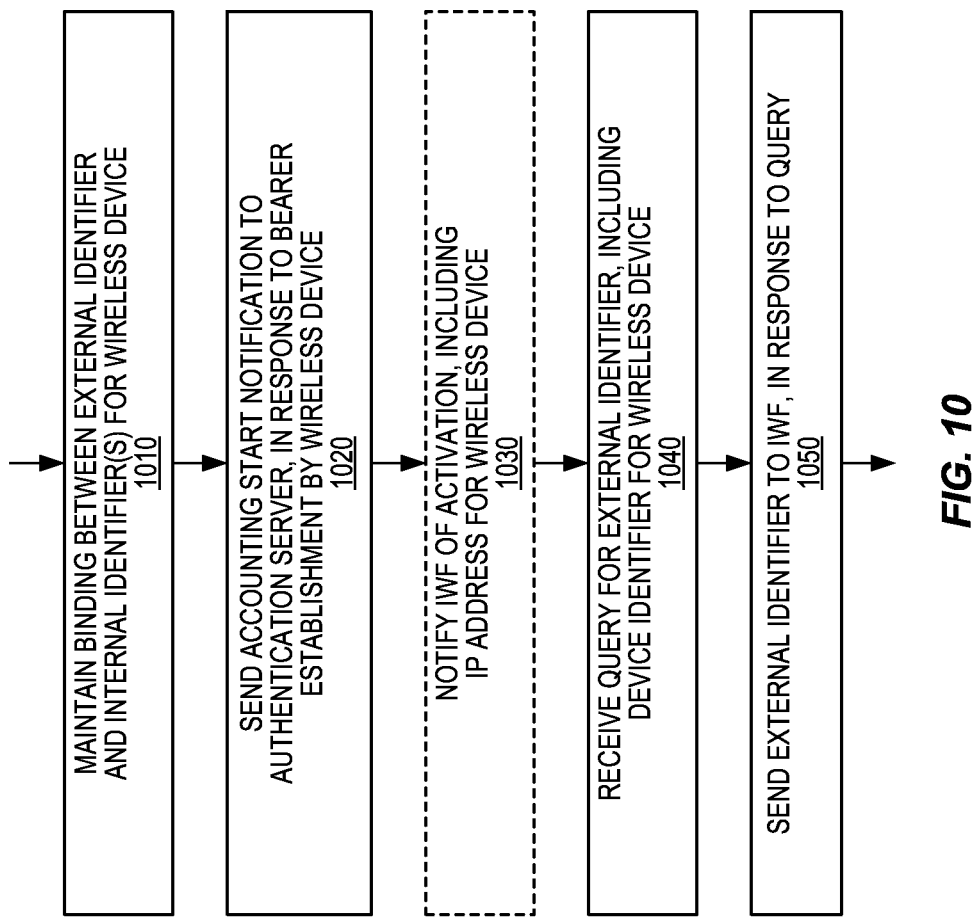
FIG. 10 is a process flow diagram of another embodiment of a method of providing an external identifier for a wireless device to a service provider external to the wireless communication network serving the wireless device.

Another approach to providing an external identifier for a wireless device to a service provider is illustrated in the call flow shown in FIG. 9, as well as in the process flow diagram of FIG. 10. Referring first to FIG. 9, it will be appreciated that the HSS maintains a binding between service provider subscription for the wireless device and an internal identifier for the wireless device, such as an IMSI. This is shown at Step 0 of FIG. 9. As shown at Step 1, the wireless device establishes an access network registration, using procedures specified for the particular type of access network. Then, as shown at Step 2, the wireless device initiates the establishment of an access network bearer, e.g., a Public Data Network (PDN) connection as specified by 3GPP TS 24.301.

In response to the establishment of the access network bearer, the access network triggers an accounting start message to the authentication server (AAA), the accounting start message including an IP address for the wireless device and a data network identifier corresponding to the service provider, such as an APN and/or NSAPI. The AAA then notifies the IWF, e.g., based on a prior configuration or previous subscription established by the IWF. This notification includes an identifier corresponding to the device, such as an MSISDN or other identifier associated with the device, as well as the IP address allocated to the M2M wireless device and an Access Point Name (APN) or other data network identifier that maps to the data session/M2M service provider. The APN or equivalent information sent by the HSS allows the IWF to know the M2M SP associated with the wireless device. This identifier may be referred to as a "user identifier" or a "device identifier." The IWF then queries the home subscriber server (HSS) to retrieve the external identifier for the wireless device, using the device identifier provided to it by the AAA. All of these steps are shown at Step 2 of FIG. 9. The IWF then sends the external identifier for the wireless device, along with an IP address for the wireless device, to the service provider node, as shown at Step 3.

When the M2M Service Capability Layer (SCL) in the wireless device subsequently performs an M2M SCL Registration using existing ETSI procedures (or when an equivalent application-layer registration is performed), the M2M service provider SCL is able to correlate the external identifier provided to it by the IWF to the wireless device SCL (DSCL or GSCL) using the IP address, which is an M2M point-of-communication (m2mpoc) for the device, provided to it during the M2M SCL registration. The service provider node can then store the external identifier, and bind it to the service provider network identifier for the M2M device, also received by the service provider node during the M2M SCL registration process, for use in subsequent triggering of the device by the service provider node.

The process flow diagram of FIG. 10 illustrates a method that corresponds to the call flow of FIG. 9, from the perspective of one or more nodes in the wireless communication network serving the wireless device, such as a Home Subscriber Server (HSS), and/or an authentication server (AAA), or a node combining the functions of both an HSS and an AAA.

As shown at block 1010, the illustrated method begins with the maintaining of a binding between service provider subscription information for the wireless device and an internal identifier for the wireless device. This might be carried out by an HSS node, for example. As shown at block 1020, an accounting start notification is sent to an authentication server, in response to establishment of a bearer by the wireless device. This accounting start notification includes an IP address corresponding to the bearer set up by the wireless device.

A query for an external identifier for the wireless device is subsequently received, e.g., at a HSS node, as shown at block 1040. This query, which may be received from an IWF, in some embodiments, includes an identifier for the wireless device that has been obtained from the authentication server or HSS. In response to the query, the external identifier for the wireless device is then sent to an IWF node, as shown at block 1050, for forwarding to the service provider in conjunction with the IP address for the wireless device.

As noted above, in some embodiments the query is received at the HSS node from the IWF node. In some of these embodiments, the method further includes sending the IWF an activation notification, prior to receiving said query. This notification includes the IP address for the wireless device and an identifier for the wireless device. This is shown at block 1030 of FIG. 10, which is shown with a dashed outline to indicate that this operation may not appear in every embodiment of the illustrated method, since there are other ways for the IWF (or other node) to obtain the IP address and/or the device identifier. Where this operation does occur, the query from the IWF may be in response to this notification.

Figure 11:
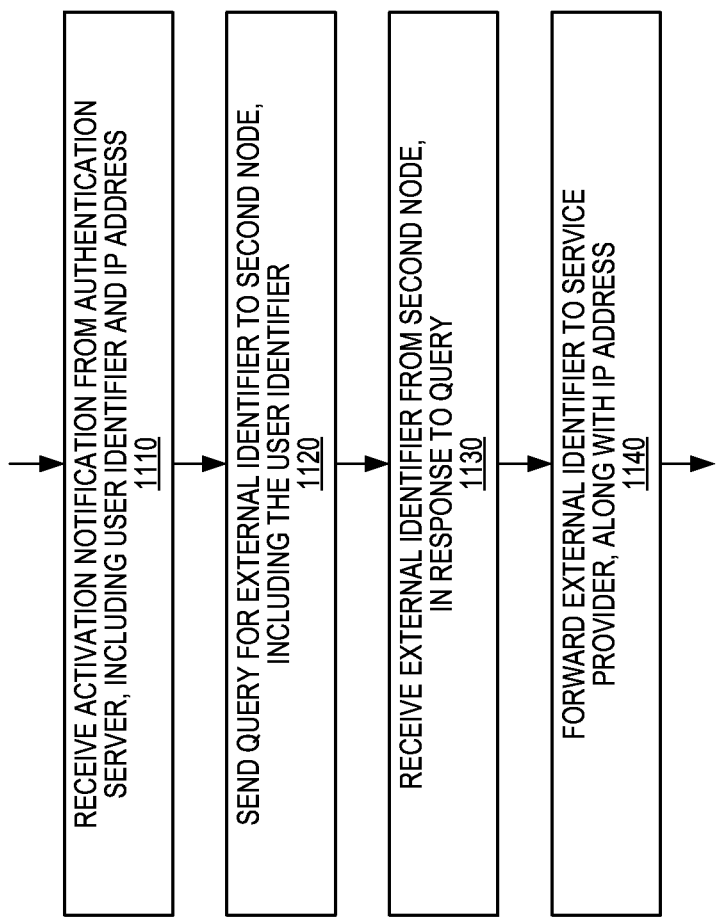
FIG. 11 is a process flow diagram illustrating an example method carried out by an Inter-Working Function.

The process flow diagram of FIG. 11 illustrates another method corresponding to the call flow of FIG. 9, this time from the perspective of a node that provides an Inter-Working Function (IWF) between the wireless communication network and a service provider network that is external to the wireless communication network.

As shown at block 1110, the illustrated method begins with the receiving of an activation notification from an authentication server, the activation notification indicating that a wireless device has attached to the network. The activation notification includes an identifier for the wireless device (e.g., and MSISDN) and an IP address for the wireless device, as well as an APN or other data network identifier that maps to the M2M service provider. The method continues, as shown at block 1120, with sending a query for an external identifier for the wireless device, to a second node in the wireless communication network, e.g., an HSS. This query includes the user identifier for the wireless device.

As shown at block 1130, the IWF then receives the external identifier for the wireless device, in response to the query. The external identifier is forwarded to the service provider, in conjunction with the IP address for the wireless device, as shown at block 1140.

The various nodes of the above discussion can be implemented through the use of a processor operatively connected to a memory storing instructions that cause the processor to carry out the methods described above. Communication with external nodes can be managed through the use of a network interface. In a logical mapping, engines and processors can be used for individual steps and functions to create a logical instance of a node.

Figure 6:
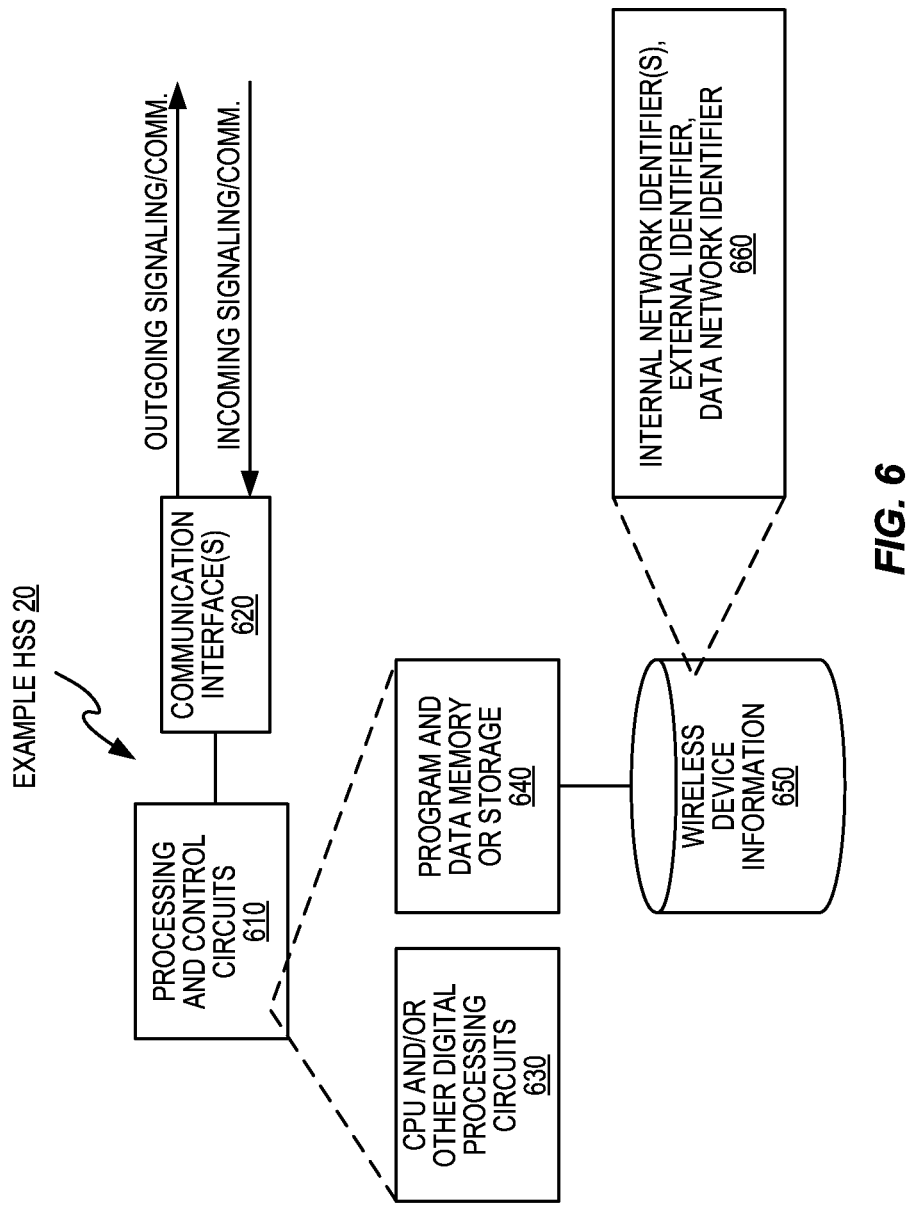
FIG. 6 is a block diagram of one embodiment of an HSS or other node within the wireless communication network and which is configured to perform all or part of the method illustrated in FIG. 3.

FIG. 6, for instance, introduces an example network node configured as an HSS 20, which may be adapted to implement all or part of the process illustrated in FIGS. 3, 4, and/or FIG. 10, and/or parts of the signaling flows shown in FIG. 2 and FIG. 9, and/or variations of those methods and signaling flows. In the illustrated example, the HSS 20 comprises a communication interface 620 that is configured to communicate with the IWF 22, which communicatively links the access network 12 of the HSS 20 to the service provider network 14, which is external to the access network 12. It will be understood that the communication interface 620 actually may comprise multiple interfaces, and may interface to more than one physical layer and/or may support a number of signaling protocols and interface types for communicating with multiple types of other nodes.

The HSS 20 further includes a processing circuit 610 that is operatively associated with the communication interface 620. For example, the processing circuit 610 comprises one or more CPUs and/or other digital processing circuitry 630 that includes or is associated with a computer-readable medium, such as program and data memory or other storage 640. The storage 640 holds wireless device information 650, among other things.

For example, the storage 640, which may be non-volatile storage, holds information that binds or maps individual external identifiers to respective internal network identifiers used by the wireless communication network. In particular, the wireless device information 650 held by storage 640 includes internal network identifier(s) for each of one or more wireless devices 10, along with one or more associated external identifiers and one or more associated data network identifiers, as shown at 660. More broadly, the wireless device information 650 may comprise information identifying the service provider network 14, information identifying the wireless devices 10 that are associated with the service provider network 14, and information identifying the external identifiers—e.g., a range—to be allocated to individual ones of the wireless devices 10 that are associated with the service provider network 14.

The information identifying the associated wireless devices 10 may comprise the IMSIs or other such access network identifiers of the wireless devices 10, so that individual ones of the wireless devices 10 can be recognized as being associated with the service provider network 14 when they attach to the access network 12. Further, the wireless device information 650 may include an APN or NSAPI values for use by the wireless devices 10 in directing communications toward the service provider network 14. Also, as noted, the wireless device information 650 may comprise a list or range of external identifiers that have been allocated or otherwise predefined for use with the service provider network 14.

In a particular but non-limiting example, the storage 640 is used by the HSS 20 to maintain the following mapping for a given wireless device 10: internal network identifier→external identifier→data network identifier for the service provider network 14, including for example, an APN or NSAPI associated with the service provider network 14. Thus, in at least one embodiment, the HSS 20 is configured to store wireless device information accessible to the processing circuit 610, where the wireless device information includes the internal network identifier of the wireless device 10, as mapped to the external identifier assigned to the wireless device 10, and as further mapped to the access point name or network identifier and the service provider network 14.

In several embodiments, the processing circuit 610 in HSS 20 is adapted (e.g., with suitable program code stored in program and data memory or storage 640) to carry out all or parts of the method illustrated in FIGS. 3 and 4, and variants thereof. More particularly, the processing circuit 610 in some embodiments is configured to maintain a binding between an external identifier for the wireless device, an internal identifier for the wireless device, and a data session identifier corresponding to the external identifier. The processing circuit may be further configured to receive a query from a second node in the radio access network (e.g., via communication interface(s) 620), the query comprising the internal identifier for the wireless device, and to send (e.g., via the communication interface(s) 620) the external identifier to the second node. As discussed above, the second node may be an interworking function (IWF) node, in some embodiments. In some embodiments, the internal identifier is an MSISDN for the wireless device. Likewise, the associated data network identifier may be an APN or a NSAPI, or both, in some embodiments.

In some embodiments, the HSS node illustrated in FIG. 6 may be configured to act as both a home subscriber server (HSS) and an authentication server. In some of these embodiments, the processing circuits (610) are adapted to maintain a binding between an external identifier for the wireless device, an IP address for the wireless device, and an internal identifier for the wireless device, and a data session information for the wireless device, to receive a query from a second node in the wireless communication network, the query comprising the IP address for the wireless device, and to send the external identifier to the second node. In some embodiments, this may be done by returning a device identifier for the wireless device to the second node, in response to the query, and receiving a second query from the second node, the second query comprising the device identifier. The external identifier in these embodiments is sent to the second node in response to the second query. Again, the second node may be an interworking function (IWF) node, in some embodiments.

Figure 7:
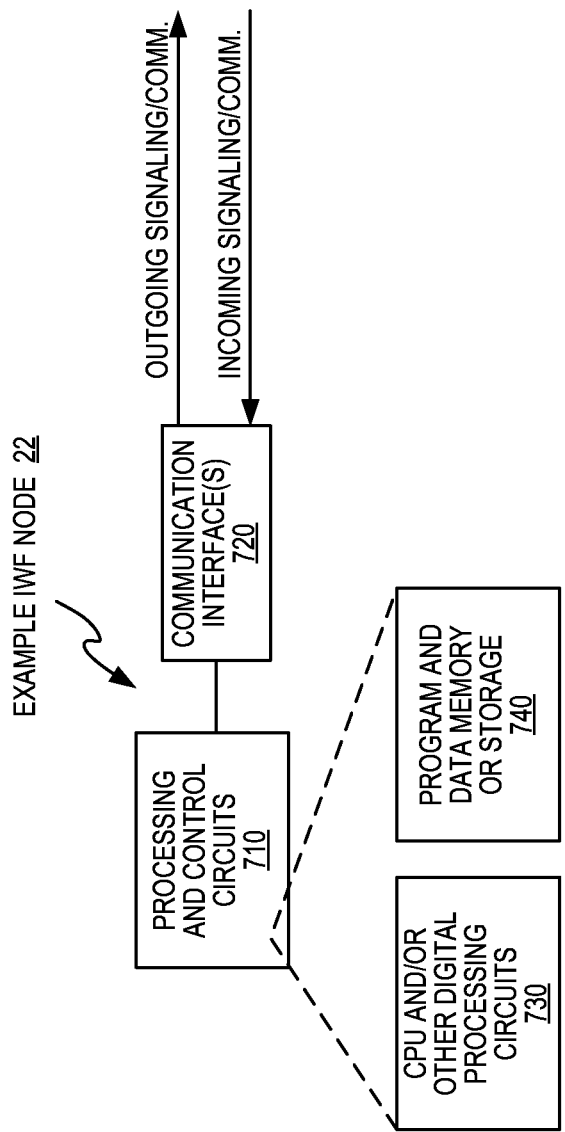
FIG. 7 is a block diagram of one embodiment of an IWF or other node within the wireless communication network and which is configured to perform all or part of the method illustrated in FIG. 3.

FIG. 7 introduces another example network node, in this case configured as an IWF 22, which again may be adapted to implement all or part of the processes illustrated in FIGS. 3, 4, and/or 11, and/or parts of the signaling flows shown in FIGS. 2 and 9, as well as variations of those methods and signaling flows. Thus, in one or more embodiments, the network node 22 pictured in FIG. 7 is configured to implement an IWF between an access network 12 and a service provider network 14. In the illustrated example, the network node 22 comprises a communication interface 720 that is configured to send signaling toward and to receive signaling from one or more nodes within an access network 12, e.g., an HSS 20, and to send signaling toward and to receive signaling from one or more nodes within a service provider network 14, e.g., the service provider network node 24. Of course, it will be appreciated that the communication interface 720 may, in fact, comprise more than one interface and/or may implement multiple physical-layer interfaces and/or signaling protocols for communicating within the access network 12, with the service provider network 14, and with wireless devices 10 via the access network 12.

The node 22 implements the IWF functionality described above by further including a processing circuit 710 that is operatively associated with the communication interface 720. The processing circuit 710 may comprise one or more CPUs or other digital processing circuitry 730 that include or are associated with one or more computer-readable mediums, such as program and data memory or storage 740. In an example configuration, storage 740 stores a computer program comprising computer program instructions. The processing circuit 710 is configured to carry out all or part of the methods illustrated in FIG. 3, 4, and/or 11, based at least partially on its execution of the stored computer program instructions. The storage 740 also may be used to store at least temporarily information that is received from the HSS 20 and/or from the service provider network 14. For example, the storage 740 may be used to store external identifiers, NAP or NSAPI information, etc., in support of the IWF operations disclosed herein.

More particularly, in some embodiments processing circuit 710 is adapted (e.g., using program code stored in storage 740) to receive, from the service provider, a request for the external identifier, said request including an IP address for the wireless device, to retrieve the external identifier from another node in the wireless communication network, using the IP address, and to send the external identifier to the service provider, in response to the request.

In some embodiments, processing circuit 710 is adapted to retrieve the external identifier by sending a query to a second node in the wireless communication network, in response to the request, the query comprising the IP address for the wireless device, and receiving the external identifier for the wireless device in response to the query. The second node may be a Home Subscriber Server (HSS) node, for example. In other embodiments, processing circuit 710 is adapted to retrieve the external identifier by sending a first query from the IWF node to a second node in the wireless communication network, in response to the request, the first query comprising the IP address for the wireless device, receiving a device identifier for the wireless device in response to the first query, sending a second query from the IWF node to a third node in the wireless communication network, the second query comprising the device identifier, and receiving the external identifier for the wireless device in response to the second query. In some of these embodiments, the second node is an authentication server node and the third node is a Home Subscriber Server (HSS) node in the wireless communication network. The device identifier in these embodiments may be an MSISDN for the wireless device, for example.

In any of the IWF node embodiments described above, the processing circuit 710 may be further adapted to receive a trigger message from the service provider, subsequently to sending the external identifier to the service provider, the trigger message including the external identifier for the wireless device. The processing circuit 710 then retrieves the internal identifier for the wireless device, using the external identifier, and uses the internal identifier to wake the wireless device.

Figure 8:
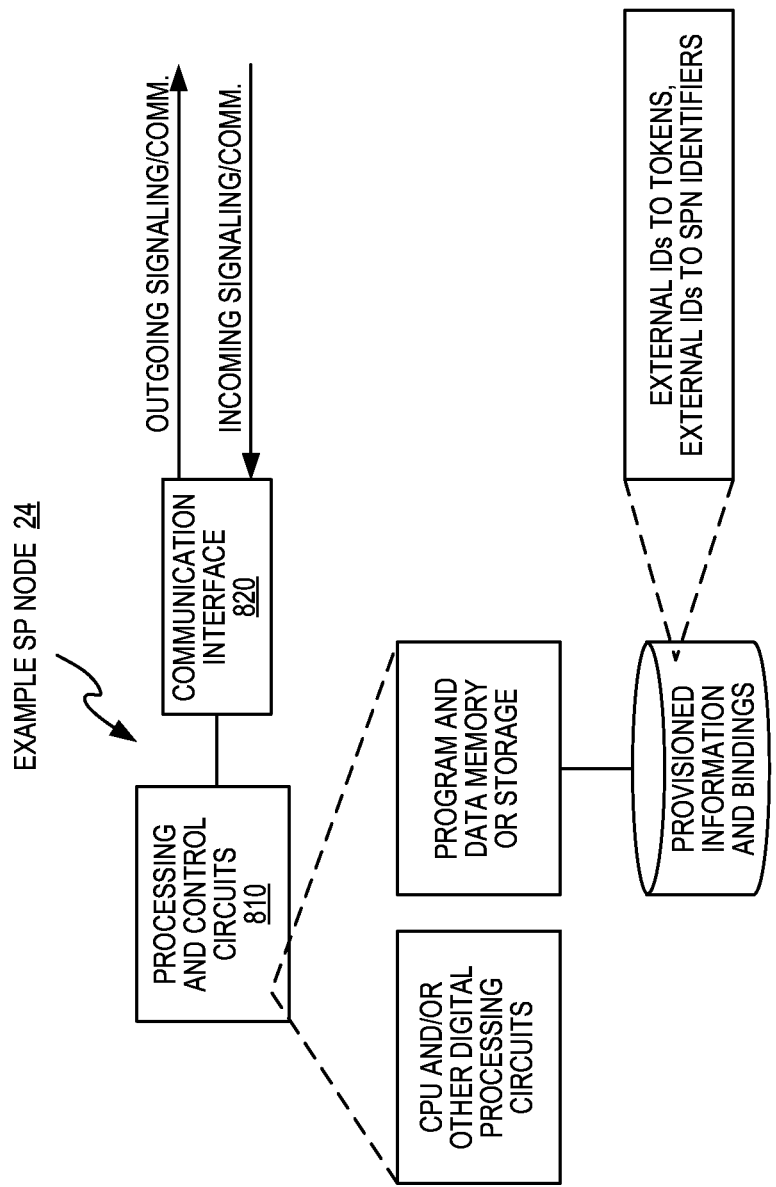
FIG. 8 is a block diagram of one embodiment of a service provider node.

FIG. 8 illustrates an example configuration of a server provider node 24, which is configured to perform the method illustrated in FIG. 5, for example. The node 24 includes a communication interface 820 for communicating with the wireless communication network 12 and for communicating with the wireless device 10 via signaling conveyed through the access network 12. Thus, the communication interface 820 may comprise more than one interface circuit, or at least may comprise processing circuitry that is configured to implement protocols for communicating with on more nodes associated with the access network 12 and for communicating with the wireless device 10 via that access network 12.

The node 24 further includes a processing circuit 810 that is configured to: establish a data session with a wireless device having a service capability layer (SCL) associated with the service provider network, wherein said data session is carried over a radio access network and the establishment of the data session is initiated by the wireless device; receive, from the wireless device, a service provider network identifier for the wireless device; send, to the radio access network, a request for an external identifier associated with the wireless device, the request including an IP address used to address the wireless device through the radio access network; receive the external identifier from the radio access network, in response to the request; and bind the external identifier received from the radio access network to the service provider network identifier, to thereby establish a mapping between the external identifier and the service provider network identifier for subsequent use by the service provider network in triggering communications with the wireless device through the access network. In some embodiments, the processing circuit 810 is configured to send the request for the external identifier to an interworking function (IWF) in the radio access network and to subsequently receive the external identifier from the IWF in the radio access network. In some embodiments, the IP address is received from the wireless device, e.g., along with the service provider network identifier for the wireless device. In other embodiments, the service provider node 24 instead receives a Fully Qualified Domain Name from the wireless device; the service provider node 24 is configured to use conventional techniques for resolving the Fully Qualified Domain Name to obtain the IP address in these embodiments.

In some embodiments, the service provider network comprises a Machine Type Communication (MTC) network, wherein the service provider network identifier is a Services Capability Layer ID (SCL-ID) associated with an MTC application implemented in the wireless device. In these embodiments, the processing circuit 810 is configured to bind the external identifier to the SCL-ID, for subsequent use by the service provider network in triggering communications with the wireless device through the access network. In some of these embodiments, the processing circuit 810 is configured to receive the service provider network identifier from the wireless device by performing, via communication through the access network, an M2M service bootstrapping and a corresponding M2M service registration of the MTC application implemented in the wireless device. The processing circuit in these embodiments is further configured to bind the external network identifier to the SCL-ID following service registration.

As can be seen from the detailed descriptions of FIGS. 6, 7, and 8, embodiments of the techniques described herein may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method. Those of ordinary skill in the art will appreciate that other instructions and operations necessary to implement the techniques described herein may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the presently described techniques, which scope is defined solely by the claims appended hereto.

With these and other variations and extensions in mind, those skilled in the art will appreciate that the foregoing description and the accompanying drawings represent non-limiting examples of the systems and apparatus taught herein. As such, the presently disclosed systems, apparatus, and methods are not limited by the foregoing description and accompanying drawings, but are instead limited only by the following claims and their legal equivalents.

What is claimed is:

1. A method, in one or more nodes of a wireless communication network serving a wireless device, of providing an external identifier for the wireless device to a service provider external to the wireless communication network, the method comprising:
   maintaining a binding between the external identifier and an internal identifier for the wireless device;
   establishing a data session for the wireless device and corresponding to the service provider, wherein said establishing is initiated by the wireless device;
   receiving, from the service provider, a request for the external identifier, said request including an IP address for the wireless device; and
   sending the external identifier to the service provider, in response to the request.

2. The method of claim 1, wherein establishing a data session for the wireless device comprises activating a PDP context.

3. The method of claim 1, wherein establishing a data session for the wireless device comprises establishing an Evolved Packet Subsystem (EPS) bearer.

4. The method of claim 1, wherein said request for the external identifier is received at an InterWorking Function (IWF) node in the wireless communication network, the method further comprising:
   sending a query from the IWF node to a second node in the wireless communication network, in response to the request, the query comprising the IP address for the wireless device; and
   receiving the external identifier for the wireless device in response to the query.

5. The method of claim 4, wherein said second node is a Home Subscriber Server (HSS) node.

6. The method of any of claim 1, wherein said request for the external identifier is received at an InterWorking Function (IWF) node in the wireless communication network, the method further comprising:
   sending a first query from the IWF node to a second node in the wireless communication network, in response to the request, the first query comprising the IP address for the wireless device;
   receiving a device identifier for the wireless device in response to the first query;
   sending a second query from the IWF node to a third node in the wireless communication network, the second query comprising the device identifier; and
   receiving the external identifier for the wireless device in response to the second query.

7. The method of claim 6, wherein said second node is an authentication server node and the third node is a Home Subscriber Server (HSS) node in the wireless communication network.

8. The method of claim 6, wherein the device identifier is an MSISDN for the wireless device.

9. The method of claim 1, further comprising:
   receiving a trigger message from the service provider, subsequently to sending the external identifier to the service provider, the trigger message including the external identifier for the wireless device;
   retrieving the internal identifier for the wireless device, using the external identifier; and
   using the internal identifier to wake the wireless device.

10. An M2M interworking function (IWF) node configured for use in a wireless communication network serving a wireless device, the M2M IWF node comprising
    one or more interfaces adapted for communication with at least a radio access network serving the wireless device and one or more other nodes in the wireless communication network, and
    a processing circuit adapted to provide an external identifier for the wireless device to a service provider external to the wireless communication network by:
        receiving, from the service provider, a request for the external identifier, said request including an IP address for the wireless device;
        retrieving the external identifier from another node in the wireless communication network, using the IP address; and
        sending the external identifier to the service provider, in response to the request.

11. The M2M IWF node of claim 10, wherein the processing circuit is adapted to retrieve the external identifier by:
    sending a query to a second node in the wireless communication network, in response to the request, the query comprising the IP address for the wireless device;
    receiving the external identifier for the wireless device in response to the query.

12. The M2M IWF node of claim 11, wherein said second node is a Home Subscriber Server (HSS) node.

13. The M2M IWF node of claim 10, wherein the processing circuit is adapted to retrieve the external identifier by:
    sending a first query from the IWF node to a second node in the wireless communication network, in response to the request, the first query comprising the IP address for the wireless device;
    receiving a device identifier for the wireless device in response to the first query;
    sending a second query from the IWF node to a third node in the wireless communication network, the second query comprising the device identifier; and
    receiving the external identifier for the wireless device in response to the second query.

14. The M2M IWF node of claim 13, wherein said second node is an authentication server node and the third node is a Home Subscriber Server (HSS) node in the wireless communication network.

15. The M2M IWF node of claim 13, wherein the device identifier is an MSISDN for the wireless device.

16. The M2M IWF node of claim 10, wherein the processing circuit is further adapted to:
  receive a trigger message from the service provider, subsequently to sending the external identifier to the service provider, the trigger message including the external identifier for the wireless device; and
  retrieve an internal identifier for the wireless device, using the external identifier; and
  use the internal identifier to wake the wireless device.

17. A combined home subscriber server and authentication server node for use in a wireless communication network serving a wireless device, the node comprising:
  one or more interfaces adapted for communication with one or more other nodes in the wireless communication network, and
  one or more processing circuits adapted to:
    maintain a binding between an external identifier for the wireless device, an IP address for the wireless device, an internal identifier for the wireless device, and data session information for the wireless device;
    receive a query from a second node in the wireless communication network, the query comprising the IP address for the wireless device; and
    send the external identifier to the second node.

18. The combined home subscriber server and authentication server node of claim 17, wherein the one or more processing circuits are further adapted to:
  return a device identifier for the wireless device to the second node, in response to the query;
  receive a second query from the second node, the second query comprising the device identifier; and
  send the external identifier to the second node in response to the second query.

19. The combined home subscriber server and authentication server node of claim 17, wherein said second node is an interworking function (IWF) node.

20. The combined home subscriber server and authentication server node of claim 18, wherein the device identifier is an MSISDN for the wireless device.

21. A method at a network node that is associated with a service provider network, the method comprising:
  establishing a data session with a wireless device having a service capability layer (SCL) associated with the service provider network, wherein said data session is carried over a wireless communication network;
  receiving, from the wireless device, a service provider network identifier for the wireless device;
  sending, to the wireless communication network, a request for an external identifier associated with the wireless device, the request including an IP address used to address the wireless device through the wireless communication network;
  receiving the external identifier from the wireless communication network, in response to the request; and
  binding the external identifier received from the wireless communication network to the service provider network identifier, to thereby establish a mapping between the external identifier and the service provider network identifier for subsequent use by the service provider network in triggering communications with the wireless device through the wireless communication network.

22. The method of claim 21, further comprising receiving from the wireless device, prior to said sending, the IP address or a Fully Qualified Domain Name from which the IP address can be derived.

23. The method of claim 21, wherein the service provider network comprises a Machine Type Communication (MTC) network, wherein the service provider network identifier is a Services Capability Layer ID (SCL-ID) associated with an MTC application implemented in the given wireless device, and wherein binding the external identifier to the service provider network identifier comprises binding the external identifier to the SOL-ID, for subsequent use by the service provider network in triggering communications with the wireless device through the access network.

24. The method of claim 23, wherein subsequently receiving the service provider network identifier from the wireless device comprises performing, via communication through the access network, a Machine-to-Machine (M2M) service bootstrapping and a corresponding M2M service registration of the MTC application implemented in the wireless device, and wherein said binding is performed as part of the M2M service registration.

25. The method of claim 21, wherein said request for the external identifier is sent to an interworking function (IWF) in the wireless communication network and wherein the external identifier is subsequently received from the IWF in the wireless communication network.

26. A network node for use in association with a service provider network, said network node comprising:
  one or more communication interfaces configured to communicate with a node in or associated with an access network; and
  a processing circuit operatively associated with the one or more communication interfaces and configured to:
    establish a data session with a wireless device having a service capability layer (SCL) associated with the service provider network, wherein said data session is carried over a radio access network;
    receive, from the wireless device, a service provider network identifier for the wireless device;
    send, to the radio access network, a request for an external identifier associated with the wireless device, the request including an IP address used to address the wireless device through the radio access network;
    receive the external identifier from the radio access network, in response to the request; and
    bind the external identifier received from the radio access network to the service provider network identifier, to thereby establish a mapping between the external identifier and the service provider network identifier for subsequent use by the service provider network in triggering communications with the wireless device through the access network.

27. The network node of claim 26, wherein the processing circuit is further configured to receive from the wireless device, prior to said sending, the IP address or a Fully Qualified Domain Name from which the IP address can be derived.

28. The network node of claim 26, wherein the service provider network comprises a Machine Type Communication (MTC) network, wherein the service provider network identifier is a Services Capability Layer ID (SCL-ID) associated with an MTC application implemented in the wireless device, and wherein the processing circuit is configured to bind the external identifier to the SCL-ID, for subsequent use by the service provider network in triggering communications with the wireless device through the access network.

29. The network node of claim 28, wherein the processing circuit is configured to receive the service provider network identifier from the wireless device by performing, via communication through the access network, an M2M service bootstrapping and a corresponding M2M service registration of the MTC application implemented in the wireless device, and wherein the processing circuit is further configured to bind the external network identifier to the SCL-ID as part of the M2M service registration.

30. The network node of claim 26, wherein the processing circuit is configured to send said request for the external identifier to an interworking function (IWF) in the radio access network and to subsequently receive the external identifier from the IWF in the radio access network.

\* \* \* \* \*